United States Patent
LaMance et al.

(10) Patent No.: US 8,242,956 B2
(45) Date of Patent: *Aug. 14, 2012

(54) DISTRIBUTED ORBIT MODELING AND PROPAGATION METHOD FOR A PREDICTED AND REAL-TIME ASSISTED GPS SYSTEM

(75) Inventors: James W. LaMance, Hixson, TN (US); Maria Eagen, Purcellville, VA (US); Guylain Roy-MacHabee, Vancouver (CA)

(73) Assignee: Rx Networks, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,273

(22) Filed: Jul. 13, 2011

(65) Prior Publication Data

US 2011/0267230 A1 Nov. 3, 2011

Related U.S. Application Data

(63) Continuation of application No. 12/536,348, filed on Aug. 5, 2009, now Pat. No. 8,004,462, which is a continuation of application No. 11/740,206, filed on Apr. 25, 2007, now Pat. No. 7,612,712.

(60) Provisional application No. 60/745,593, filed on Apr. 25, 2006.

(51) Int. Cl.
*G01S 19/27* (2010.01)
*G01S 19/06* (2010.01)
*G01S 19/25* (2010.01)

(52) U.S. Cl. .......... 342/357.66; 342/357.43; 342/357.64

(58) Field of Classification Search ............. 342/357.66, 342/357.42, 357.64, 357.43
See application file for complete search history.

(56) References Cited

U.S. PATENT DOCUMENTS

| | | | |
|---|---|---|---|
| 5,689,270 A | 11/1997 | Kelley et al. | 342/357 |
| 5,774,829 A | 6/1998 | Cisneros et al. | 701/213 |
| 5,909,381 A | 6/1999 | Shome et al. | 364/578 |
| 6,018,313 A | 1/2000 | Engelmayer et al. | 342/357 |
| 6,035,202 A | 3/2000 | Camp, Jr. | 455/456 |
| 6,133,872 A | 10/2000 | Mitchell et al. | 342/357.1 |
| 6,219,385 B1 | 4/2001 | Weinberg | 375/259 |
| 6,236,365 B1 | 5/2001 | LeBlanc et al. | 342/457 |
| 6,304,216 B1 | 10/2001 | Gronemeyer | 342/378 |

(Continued)

FOREIGN PATENT DOCUMENTS

JP 2003021672 1/2003

(Continued)

OTHER PUBLICATIONS

S.G. Francisco, GPS Operation Control Segment, in Global Positioning System:Theory and Applications, vol. 1, ed. B.W. Parkinson et al., p. 435 and 457-463, 1996.*

(Continued)

*Primary Examiner* — Jack W Keith
*Assistant Examiner* — Fred H Mull
(74) *Attorney, Agent, or Firm* — Seed IP Law Group PLLC

(57) ABSTRACT

A mobile device includes a processor for generating a predicted orbital state vector using an initial satellite position and velocity and force model parameters received from a server, the predicted orbital state vector being used to generate satellite navigation data; and a GNSS receiver in communication with the processor for receiving the satellite navigation data; wherein the satellite navigation data is valid for a time period.

20 Claims, 11 Drawing Sheets

U.S. PATENT DOCUMENTS

| | | | |
|---|---|---|---|
| 6,389,291 B1 | 5/2002 | Pande et al. | 455/456 |
| 6,417,801 B1 | 7/2002 | van Diggelen | 342/357.08 |
| 6,429,811 B1 * | 8/2002 | Zhao et al. | 342/357.66 |
| 6,519,466 B2 | 2/2003 | Pande et al. | 455/456 |
| 6,542,820 B2 | 4/2003 | LaMance et al. | 701/213 |
| 6,560,534 B2 | 5/2003 | Abraham et al. | 701/213 |
| 6,590,527 B2 | 7/2003 | Mutoh et al. | 342/357.09 |
| 6,606,346 B2 | 8/2003 | Abraham et al. | 375/142 |
| 6,651,000 B2 | 11/2003 | van Diggelen et al. | 701/213 |
| 6,703,972 B2 | 3/2004 | van Diggelen | 342/357.09 |
| 6,704,651 B2 | 3/2004 | van Diggelen | 701/213 |
| 6,829,535 B2 | 12/2004 | van Diggelen et al. | 701/213 |
| 6,907,224 B2 | 6/2005 | Younis | 455/12.1 |
| 6,915,208 B2 | 7/2005 | Garin et al. | 701/213 |
| 6,937,187 B2 | 8/2005 | van Diggelen et al. | 342/357.12 |
| 7,009,555 B2 | 3/2006 | Tsujimoto et al. | 342/357.1 |
| 7,043,363 B2 | 5/2006 | Yamamoto et al. | 701/213 |
| 7,091,904 B2 | 8/2006 | Vantalon et al. | 342/357.03 |
| 7,132,980 B2 | 11/2006 | Bloebaum et al. | 342/378 |
| 7,158,080 B2 | 1/2007 | van Diggelen | 342/357.15 |
| 7,302,225 B2 | 11/2007 | Younis | 455/12.1 |
| 7,612,712 B2 | 11/2009 | LaMance et al. | 342/357.1 |
| 2005/0140545 A1 | 6/2005 | Subbarao et al. | 342/357.12 |
| 2005/0231423 A1 | 10/2005 | Han et al. | 342/357.02 |
| 2006/0038719 A1 | 2/2006 | Pande et al. | 342/357.12 |
| 2006/0195262 A1 | 8/2006 | Draganov | 701/214 |
| 2006/0282216 A1 | 12/2006 | Robbins | 701/214 |
| 2007/0273581 A1 | 11/2007 | Garrison et al. | 342/357.03 |
| 2008/0018527 A1 | 1/2008 | LaMance et al. | 342/357.1 |
| 2008/0111738 A1 | 5/2008 | Han | 342/357.12 |
| 2008/0129593 A1 | 6/2008 | Garin et al. | 342/357.15 |
| 2008/0284646 A1 | 11/2008 | Walley et al. | 342/357.09 |
| 2008/0291086 A1 | 11/2008 | Walley et al. | 342/367 |
| 2008/0311870 A1 | 12/2008 | Walley et al. | 455/186.1 |
| 2010/0090896 A1 | 4/2010 | LaMance et al. | 342/357.15 |

FOREIGN PATENT DOCUMENTS

| | | |
|---|---|---|
| WO | 2008055223 | 5/2008 |

OTHER PUBLICATIONS

In general. The American Heritage Dictionary of Idioms, 1997. Retrieved from http://www.credoreference.com/entry/hmidiom/in_general.*

U.S. Appl. No. 60/745,593, filed Apr. 25, 2006 in the name of Jimmy W. LaMance et al., 6 pages.

U.S. Appl. No. 11/740,206, filed Apr. 25, 2007 in the name of James W. LaMance et al., 82 pages.

Office Action dated Mar. 13, 2009, relating to U.S. Appl. No. 11/740,206, 9 pages.

Amendment dated Jul. 6, 2009, relating to U.S. Appl. No. 11/740,206, 16 pages.

O. Montenbruck et al, "Reduced dynamic orbit determination using GPS code and carrier measurements." Aerospace Science and Technology, Feb. 25, 2005, pp. 261-271, vol. 9.

LaMance et al., "Distributed Orbit Modeling and Propagation Method for a Predicted and Real-Time Assisted GPS System," Preliminary Amendment filed Dec. 23, 2009, for U.S. Appl. No. 12/536,348, 4 pages.

LaMance et al., "Distributed Orbit Modeling and Propagation Method for a Predicted and Real-Time Assisted GPS System," Office Action mailed Jul. 27, 2010, for U.S. Appl. No. 12/536,348, 8 pages.

LaMance et al., "Distributed Orbit Modeling and Propagation Method for a Predicted and Real-Time Assisted GPS System," Amendment filed Oct. 6, 2010, for U.S. Appl. No. 12/536,348, 10 pages.

* cited by examiner

| Parameter | # of Bits | Scale Factor | Units | Incl. |
|---|---|---|---|---|
| The following fields occur once per message | | | | |
| SeedID | 32 | 1 | — | M |
| Num_Sats_Total | 6 | 1 | — | M |
| The following fields occur once per satellite | | | | |
| SatID | 6 | 1 | — | M |
| *Orbit State Vectors* | | | | |
| SatPosition | 96 | 1 | — | M |
| SatVelocity | 96 | 1 | — | M |
| *Force Model Parameters* | | | | |
| Solar | 32 | 1 | — | M |
| Constant Empirical Acceleration Terms | 32 | 1 | — | M |
| N-Times/Rev Empirical Acceleration Terms | 128 | 1 | — | M |
| Time | 32 | 1 | — | M |
| Clock | 64 | 1 | — | M |
| Total (assuming 32 satellites) | 15,590 | | | |

FIG. 2

| Parameter | # of Bits | Scale Factor | Units | Incl. |
|---|---|---|---|---|
| The following fields occur once per message ||||||
| SeedID | 32 | 1 | — | M |
| Num_Sats_Total | 6 | 1 | — | M |
| The following fields occur once per satellite |||||
| SatID | 6 | 1 | — | M |
| Orbit State Vectors |||||
| SatPositionDeltas | 48 | 1 | — | M |
| SatVelocityDeltas | 48 | 1 | — | M |
| Force Model Parameters |||||
| Force Model Deltas | 96 | 1 | — | M |
| Total (assuming 32 satellites) | 6,374 | | | |

FIG. 3

7-day Comparison
Conventional Predicted GPS  50Kb file, once a week
Distributed Predicted GPS  1949 bytes Seed, daily

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | 1,949 | 1-3m | - | 2-6m |
| Day 3 | 1,949 | 1-3m | - | 3-9m |
| Day 4 | 1,949 | 1-3m | - | 4-12m |
| Day 5 | 1,949 | 1-3m | - | 5-15m |
| Day 6 | 1,949 | 1-3m | - | 6-18m |
| Day 7 | 1,949 | 1-3m | - | 7-21m |
| Total (bytes) | 13,643 | | 51,200 | |
| Savings | 73% | | | |

7-day Comparison
Conventional Predicted GPS  50Kb file, once a week
Distributed Predicted GPS  1949 bytes Seed, 3 day cycles

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | | 2-6m | - | 2-6m |
| Day 3 | | 3-9m | - | 3-9m |
| Day 4 | 1,949 | 1-3m | - | 4-12m |
| Day 5 | | 2-6m | - | 5-15m |
| Day 6 | | 3-9m | - | 6-18m |
| Day 7 | 1,949 | 1-3m | - | 7-21m |
| Total (bytes) | 5,847 | | 51,200 | |
| Savings | 89% | | | |

FIG. 4A

7-day Comparison
    Conventional Predicted GPS    50Kb file, once a week
    Distributed Predicted GPS    1949 bytes Seed, 3 day cycles
                                  + 797 bytes Seed Updates

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | 797 | 1-3m | - | 2-6m |
| Day 3 | 797 | 1-3m | - | 3-9m |
| Day 4 | 1,949 | 1-3m | - | 4-12m |
| Day 5 | 797 | 1-3m | - | 5-15m |
| Day 6 | 797 | 1-3m | - | 6-18m |
| Day 7 | 1,949 | 1-3m | - | 7-21m |
| Total (bytes) | 9,035 | | 51,200 | |
| Savings | 82% | | | |

7-day Comparison
    Conventional Predicted GPS    50Kb file, 3 day cycles
    Distributed Predicted GPS    1949 bytes Seed, 4 day cycles
                                  + 797 bytes Seed Updates

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | 797 | 1-3m | - | 2-6m |
| Day 3 | 797 | 1-3m | - | 3-9m |
| Day 4 | 1,949 | 1-3m | 51,200 | 1-3m |
| Day 5 | 797 | 1-3m | - | 2-6m |
| Day 6 | 797 | 1-3m | - | 3-9m |
| Day 7 | 1,949 | 1-3m | 51,200 | 1-3m |
| Total (bytes) | 9,035 | | 153,600 | |
| Savings | 94% | | | |

FIG. 4B

7-day Comparison
Conventional Predicted GPS    50Kb file, daily
Distributed Predicted GPS    1949 bytes Seed, 3 day cycles
    + 797 bytes Seed Updates

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | 797 | 1-3m | 51,200 | 1-3m |
| Day 3 | 797 | 1-3m | 51,200 | 1-3m |
| Day 4 | 1,949 | 1-3m | 51,200 | 1-3m |
| Day 5 | 797 | 1-3m | 51,200 | 1-3m |
| Day 6 | 797 | 1-3m | 51,200 | 1-3m |
| Day 7 | 1,949 | 1-3m | 51,200 | 1-3m |
| Total (bytes) | 9,035 | | 358,400 | |
| Savings | 97% | | | |

7-day Comparison
Conventional Predicted GPS    50Kb file, daily
Distributed Predicted GPS    1949 bytes Seed Daily

| Transfer | Distributed Predicted GPS | | Conventional Predicted GPS | |
|---|---|---|---|---|
| | Data | Degradation | Data | Degradation |
| Day 1 | 1,949 | 1-3m | 51,200 | 1-3m |
| Day 2 | 1,949 | 1-3m | 51,200 | 1-3m |
| Day 3 | 1,949 | 1-3m | 51,200 | 1-3m |
| Day 4 | 1,949 | 1-3m | 51,200 | 1-3m |
| Day 5 | 1,949 | 1-3m | 51,200 | 1-3m |
| Day 6 | 1,949 | 1-3m | 51,200 | 1-3m |
| Day 7 | 1,949 | 1-3m | 51,200 | 1-3m |
| Total (bytes) | 13,643 | | 358,400 | |
| Savings | 96% | | | |

FIG. 4C

| Parameter | # of Bits | Scale Factor | Units | Incl. |
|---|---|---|---|---|
| Navigation Model Flow Control (once per message) | | | | |
| Num_Sats_Total | 6 | 1 | - | C |
| Satellite and Format Identification (once per satellite) | | | | |
| SatID | 6 | - | - | C |
| Satellite Status | 2 | - | Boolean | Z |
| Satellite Navigation Model and Associated Bits (once per satellite) | | | | |
| C/A or P on L2 | 2 | - | Boolean | Z |
| URA Index | 4 | - | Boolean | Z |
| SV Health | 6 | - | Boolean | Z |
| IODC | 10 | - | - | Z |
| L2 P Data Flag | 1 | - | Boolean | Z |
| SF 1 Reserved | 87 | - | - | Z |
| $T_{GD}$ | 8 | $2^{-31}$ | sec | Z |
| $T_{OC}$ | 16 | $2^4$ | sec | C |
| $af_2$ | 8 | $2^{-55}$ | sec/sec$^2$ | C |
| $af_1$ | 16 | $2^{-43}$ | sec/sec | C |
| $af_0$ | 22 | $2^{-31}$ | sec | C |
| $C_{rs}$ | 16 | $2^{-5}$ | meters | Z |
| $\Delta n$ | 16 | $2^{-43}$ | semi-circles/sec | Z |
| $M_0$ | 32 | $2^{-31}$ | semi-circles | P |
| $C_{uc}$ | 16 | $2^{-29}$ | radians | Z |
| e | 32 | $2^{-33}$ | - | P |
| $C_{us}$ | 16 | $2^{-29}$ | radians | Z |
| $(A)^{1/2}$ | 32 | $2^{-19}$ | meters$^{1/2}$ | P |
| $T_{oe}$ | 16 | $2^4$ | sec | P |
| Fit Interval Flag | 1 | - | Boolean | Z |
| AODO | 5 | 900 | sec | Z |
| $C_{ic}$ | 16 | $2^{-29}$ | radians | Z |
| OMEGA0 | 32 | $2^{-31}$ | semi-circles | P |
| $C_{is}$ | 16 | $2^{-29}$ | radians | Z |
| $\omega$ | 32 | $2^{-31}$ | semi-circles | P |
| $i_0$ | 32 | $2^{-31}$ | semi-circles | P |
| $C_{rc}$ | 16 | $2^{-5}$ | meters | Z |
| OMEGAdot | 24 | $2^{-43}$ | semi-circles/sec | Z |
| idot | 14 | $2^{-43}$ | semi-circles/sec | Z |

FIG. 5

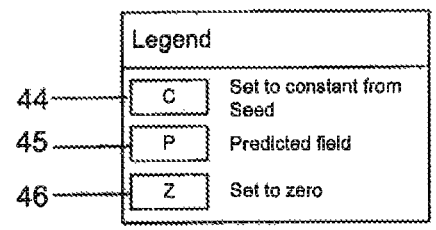

Legend
- C — Set to constant from Seed
- P — Predicted field
- Z — Set to zero

| Seed request Time Jan 23 2006 – 00:05 | | |
|---|---|---|
| Epoch | Seed ID | Seed Update ID |
| Jan 19 2006 – 00:00 – 04:00 | 114 | 2736 |
| Jan 19 2006 – 04:00 – 08:00 | 115 | 2737 |
| | | 2738 |
| | | 2739 |
| | | 2740 |
| | | 2741 |
| | | 2742 |
| | | 2743 |
| | | 2744 |
| | | 2745 |
| | | 2746 |
| | | 2747 |
| | | 2748 |
| | | 2749 |
| | | 2750 |
| | | 2751 |
| | | 2752 |
| | | 2753 |
| | | 2754 |
| | | 2755 |
| | | 2756 |
| | | 2757 |
| | | 2758 |
| | | 2759 |
| | | --- |

| Seed Request Time Jan 23 2006 – 04:05 | | |
|---|---|---|
| Epoch | Seed ID | Seed Update ID |
| Jan 19 2006 – 04:00 – 08:00 | 115 | 2760 |
| Jan 19 2006 – 08:00 – 12:00 | 116 | 2761 |
| | | 2762 |
| | | 2763 |
| | | 2764 |
| | | 2765 |
| | | 2766 |
| | | 2767 |
| | | 2768 |
| | | 2769 |
| | | 2770 |
| | | 2771 |
| | | 2772 |
| | | 2773 |
| | | 2774 |
| | | 2775 |
| | | 2776 |
| | | 2777 |
| | | 2778 |
| | | 2779 |
| | | 2780 |
| | | 2781 |
| | | 2782 |
| | | 2783 |
| | | --- |

| Seed Request Time Jan 23 2006 – 08:05 | | |
|---|---|---|
| Epoch | Seed ID | Seed Update ID |
| Jan 19 2006 – 08:00 – 12:00 | 116 | 2784 |
| Jan 19 2006 – 12:00 – 16:00 | 117 | 2785 |
| Jan 19 2006 – 16:00 – 20:00 | 118 | 2786 |
| Jan 19 2006 – 20:00 – 00:00 | 119 | 2787 |
| Jan 20 2006 – 00:00 – 04:00 | 120 | 2788 |
| Jan 20 2006 – 04:00 – 08:00 | 121 | 2789 |
| Jan 20 2006 – 08:00 – 12:00 | 122 | 2790 |
| Jan 20 2006 – 12:00 – 16:00 | 123 | 2791 |
| Jan 20 2006 – 16:00 – 20:00 | 124 | 2792 |
| Jan 20 2006 – 20:00 – 00:00 | 125 | 2793 |
| Jan 21 2006 – 00:00 – 04:00 | 126 | 2794 |
| Jan 21 2006 – 04:00 – 08:00 | 127 | 2795 |
| Jan 21 2006 – 08:00 – 12:00 | 128 | 2796 |
| Jan 21 2006 – 12:00 – 16:00 | 129 | 2797 |
| Jan 21 2006 – 16:00 – 20:00 | 130 | 2798 |
| Jan 21 2006 – 20:00 – 00:00 | 131 | 2799 |
| Jan 22 2006 – 00:00 – 04:00 | 132 | 2800 |
| Jan 22 2006 – 04:00 – 08:00 | 133 | 2801 |
| Jan 22 2006 – 08:00 – 12:00 | 134 | 2802 |
| Jan 22 2006 – 12:00 – 16:00 | 135 | 2803 |
| Jan 22 2006 – 16:00 – 20:00 | 136 | 2804 |
| Jan 22 2006 – 20:00 – 00:00 | 137 | 2805 |
| Jan 23 2006 – 00:00 – 04:00 | 138 | 2806 |
| Jan 23 2006 – 04:00 – 08:00 | 139 | 2807 |
| current | 140 | --- |

FIG. 7

| 06:45-07:00 | PRN | Orbit State Vector | PGPS Predicted Navigational Model |
|---|---|---|---|
| 06:30-06:45 | PRN | Orbit State Vector | PGPS Predicted Navigational Model |
| 06:15-06:30 | PRN | Orbit State Vector | PGPS Predicted Navigational Model |
| 06:00-06:15 | PRN | Orbit State Vector | PGPS Predicted Navigational Model |
| | 1 | X,Y,Z,V | Standard Nav Model Fields for PRN 1 |
| | 2 | X,Y,Z,V | Standard Nav Model Fields for PRN 2 |
| | 3 | X,Y,Z,V | Standard Nav Model Fields for PRN 3 |
| | 4 | X,Y,Z,V | Standard Nav Model Fields for PRN 4 |
| | ---- | ---- | ---- |
| | ---- | ---- | ---- |
| | 32 | X,Y,Z,V | Standard Nav Model Fields for PRN 32 |

FIG. 9

DISTRIBUTED ORBIT MODELING AND PROPAGATION METHOD FOR A PREDICTED AND REAL-TIME ASSISTED GPS SYSTEM

CROSS-REFERENCE TO RELATED APPLICATIONS

This application is a continuation of U.S. patent application Ser. No. 12/536,348, filed on Aug. 5, 2009 which is a continuation of U.S. patent application Ser. No. 11/740,206, filed on Apr. 25, 2007, now issued as U.S. Pat. No. 7,612,712, and claims the benefit under 35 U.S.C. 119(e) of U.S. Provisional Patent Application No. 60/745,593 filed on Apr. 25, 2006, all of which are hereby incorporated by reference.

FIELD

The present invention describes a method and apparatus for modeling, predicting, and utilizing satellite orbits with the data processing distributed between a centralized server and a client. In particular, the invention is applied to the Global Positioning System (GPS) satellites, but is equally applicable to other Global Navigation Satellite Systems (GNSS) as well as other future or planned satellite systems. The present invention relates to a predicted GPS system in a mobile communications network, whereby the predicted GPS client can propagate satellite orbits from an initial seed dataset provided by a predicted GPS server for several days into the future with minimal degradation in position accuracy, and utilize the predicted data to assist the GPS chip present on, or coupled with, the device. This predictive assistance in turn helps accelerate Time To First Fix (TTFF), optimize position solution calculations and improve the sensitivity of the GPS chip present on, or coupled with, the device.

BACKGROUND OF THE INVENTION

The present invention utilizes GPS or other Global Navigation Satellite System (GNSS) orbit predictions to seed orbit propagators embedded in mobile devices with a parameter set that provides the capability to propagate GPS orbits with the fidelity required for accurate navigation in mobile devices. The accuracy of the predictions is limited by the fidelity of the propagator implemented within the mobile device and the inability to precisely model the forces acting on the GPS satellites. The use of GPS to describe the current invention is for convenience only. For the purposes of this invention the invention described applies equally to other GNSS such as GLONASS and Galileo or other future or planned satellite based positioning systems. The context of a mobile client to describe the current invention is for convenience only. For the purposes of this invention, the invention described applies equally to any remote clients, whether mobile or fixed.

Satellite positioning and prediction is used extensively in many applications Notably, users of the GPS require the positions of the GPS satellites at the time the ranging signal was transmitted in order to compute a position solution. Currently this orbit information is provided by the satellites on the radio frequency (RF) data link in the form of a satellite position model. The model utilizes a Keplerian-like set of orbital elements, termed the ephemeris, which is valid for a limited time period, typically 4 to 6 hours. The GPS satellites broadcast the ephemeris data and the receiver demodulates the ephemeris data from the RF data link that is continuously monitoring this data stream for an updated ephemeris. The ephemeris data is a model that allows the user to evaluate a set of equations, the mathematical model of the fit to an orbit arc, and obtain the satellite position at any time during the model fit period. Although the model allows the evaluation of the satellite position beyond the 4 to 6 hours of validity, the accuracy degrades asymptotically.

In traditional GPS applications, this method was sufficient because the GPS receivers had unobstructed clear view of the satellites and the evaluation of the ephemeris model put few demands on the computing power of the receivers. However, in modern applications, such as embedding a GPS receiver within a mobile device such as a mobile phone, the GPS receiver within the mobile device does not have unobstructed clear views of the satellites and must often work in weak signal environments. This severely limits the application of this type of distribution of satellite position models because the ephemeris model cannot be reliably received from the satellites.

Current GPS receivers in mobile devices continue to demodulate the broadcast ephemeris as much as possible similar to traditional GPS receivers to provide autonomous operation. However, because of the harsh operating environments and the requirement for rapid time to fix, these receivers are often provided with assistance or aiding data that enables rapid time-to-first-fix (TTFF) and increased sensitivity. This technique of providing assistance or aid to a GPS is commonly called Assisted or Aided GPS (AGPS). A major factor in the decreased time-to-first-fix (TTFF) and increased sensitivity is the removal of the requirement to demodulate the broadcast ephemeris data prior to direct satellite signal acquisition.

Although other types of aiding data are used, such as relative range estimates, predictions of which satellites are in view, relative satellite Doppler offsets, and time and frequency aiding, this invention is focused on the satellite orbit component of AGPS. For many AGPS systems, the broadcast ephemeris is provided from a network of GPS reference stations that provide pre-formatted reference data. This data is transformed by an AGPS server into industry standard format and then delivered to the mobile device over the mobile communications network. These GPS reference stations are located at fixed installations that have clear unobstructed views of the satellites and can therefore obtain the broadcast ephemeris and provide that broadcast data over the mobile device communications link to the embedded GPS receiver. Although this is an improvement over the GPS receiver in the mobile device demodulating the broadcast ephemeris stream, it puts undue demands on the GPS receiver within the mobile device to be continuously connected to and passing data across the mobile communications network. Additionally it requires a real-time connection between the GPS reference stations and the mobile communications network that supplies the AGPS data to the mobile. This arrangement of data flowing from the GPS reference station onto the mobile communications network, then finally reaching the GPS receiver embedded within the mobile device has several points in the data path that could be unavailable at any given instant. The present invention reduces the demands on the connectivity and data transmissions on the mobile communications network and also mitigates latencies associated with the delivery of the assistance data.

A further enhancement to aiding the GPS receiver in a mobile device is provided by making ephemeris data for future times available to the mobile device. For this process, the satellite orbits are computed using observations of satellite position, satellite velocity, range, range-rate, Doppler, or similar measurements. Once an orbit is determined from the raw data, then the future positions of the satellites is determined by propagating the orbit forward with techniques well known in the art of orbital mechanics. These orbit predictions are then used to generate so-called synthetic ephemeris in the same mathematical representation as the broadcast ephemeris. Each synthetic ephemeris will cover a 4 to 6 hour block of time for a single satellite. To extend the capability beyond the 4 to 6 hour range, multiple synthetic ephemerides are provided. For example, for a single satellite, 6 synthetic ephemerides would be provided to describe the orbit for one day. Once the synthetic ephemerides are disseminated to the GPS receiver within the mobile device, the GPS receiver's knowledge of the GPS satellite positions does not expire after 4 or 6 hours or after it loses contact with the mobile communications network. Instead the GPS receiver will look to the appropriate time block of ephemeris data.

The synthetic ephemeris can be provided for as long into the future as the orbit can be reliably predicted. Typically this prediction period is between 1 and 10 days, although longer prediction periods are possible. This synthetic ephemeris method is an improvement over the previous techniques in that there is less pressure on demodulating the broadcast ephemeris data and less real-time overhead data traffic pressure on the mobile communications network.

Another vendor, Global Locate, has developed the so called Long Term Orbits (LTO) based on centrally processed future estimates of satellite position and velocity. These position and velocity are then fit into a defined time period, typically 4-6 hours, to form a continuous time period of synthetic ephemeris. The synthetic ephemeris is constructed such that when supplied to a standard GPS receiver, it mimics standard ephemeris data A synthetic ephemeris is then locally retrieved for each 4-6 hour interval that the mobile GPS receiver is to operate without connection to the LTO data source. For example, one day of LTO data would comprise six, 4-hour, synthetic ephemeris data sets for each GPS satellite. This invention is covered under U.S. Pat. Nos. 6,560,534, 6,829,535, 6,651,000, 6,542,820, 6,703,972.

For example, one day of LTO data would comprise six, 4-hour, synthetic ephemeris data sets for each GPS satellite. However, conventional predicted GPS methods like LTO require dissemination of a large group of ephemeris data sets, typically 40 Kb to 100 Kb, over a mobile communications network, each valid for 4 to 6 hours, for each satellite. The current invention significantly reduces the volume of data required to be broadcast over the mobile communications network to the order of 2 KB or less because it does not transmit pre-generated synthetic ephemeris or future estimations of satellite positions and velocities. Rather, the current invention provides the mobile device with an initial satellite position and velocity, along with some force model coefficients, from which the mobile client software can locally propagate these satellite positions and velocities into the future and locate generate its own synthetic ephemeris data, as required to supply the GPS or AGPS device Finally, conventional predicted GPS methods like LTO are typically proprietary and designed to only work with the vendor's own AGPS chipset, leading to logistical and provisioning issues. The current invention is designed to seamlessly align with existing real-time AGPS industry standards and thus easily integrate with potentially any AGPS chipset.

Prior art techniques distribute GPS orbit information to a GPS receiver via a mathematical model of the satellite position and velocity over a relatively short period of time, typically 4-6 hours. The GPS receiver within the mobile device then evaluates that model as a function of time to determine the satellite position and velocity. The prior art techniques do not provide the GPS receiver within the mobile device the ability to propagate orbit position and velocity information with the required accuracy for position computation.

The primary purpose of the GPS ephemeris data is to recover the GPS satellite position and velocity. The process described above implements the following steps: 1) prediction of the GPS satellite position and velocity into the future, 2) reduction of that prediction to a mathematical model, 3) transferring that mathematical model of the GPS satellite position and velocity to the mobile GPS receiver, and 4) the mobile GPS receiver evaluating that mathematical model to recover the GPS satellite position and velocity. The present invention eliminates the reduction to and evaluation of the mathematical model described in steps 2) and 3).

Providing estimates of a satellite position and velocity propagated into the future is well known in the art. For the GPS satellites, this service has been provided by the International Geodetic Survey (IGS) since January of 1994. Currently the IGS provides a two day prediction of GPS satellite position and velocity, as the so-called UltraRapid product combining 2 days of data with 2 days of predictions with a position and velocity for each 15 minute interval. These data products, and other IGS data products for GLONASS, GPS clocks, etc, are available from the IGS data repository.

To compute a navigation solution using the GPS satellite orbits, the GPS receiver must interpolate between the prediction times to the exact time required for the particular navigation solution. Therefore, a high degree of granularity is required in the satellite position and velocity prediction and this is precisely what the IGS supplies. These IGS products are commonly used in post-processing where GPS range measurements are collected in the field, then returned to a central location with sufficient data storage and computing power to store and interpolate the GPS satellite position data The GPS data is not used to continue the propagation to future times. To utilize the IGS-style data products in a mobile device, a relatively large amount of orbit data would be transmitted over the mobile communications network. A major motivation for the ephemeris model, the synthetic ephemeris, and the Global Locate LTO implementation is to reduce the amount of data that must be broadcast.

The prior art techniques do not provide the GPS receiver within the mobile device the ability to propagate orbital information with the required accuracy for position computation. Further, the prior art associated with providing GPS ephemeris data to the mobile device has been constrained to the mathematical model utilized in the live data broadcast from the satellite.

Accordingly, it is an object of the invention to provide a system which reduces the amount of data required to be transmitted. It is a further object of the invention to provide a GPS receiver within the mobile device which can propagate a satellite orbit, removing the dependency of the 4 to 6 hour satellite ephemeris model. It is yet a further object of the invention to provide a GPS receiver which has the capability to propagate orbits based on the amount of unused computational power that is available, thus further reducing reliance of the GPS receiver/mobile devices on the network. It is yet another object of the invention to provide rapid updates from the mobile communications network for satellite integrity through small "maintenance data" packets. It is a further object of the invention to provide the mobile device with improved integrity determinations. It is a further object of the invention to closely align with open industry standards and operate across a variety of AGPS chipsets.

SUMMARY OF THE INVENTION

According to the invention there is provided a distributed orbit and propagation method for use in a predicted GPS or GNSS system, which includes a predicted GPS server (PGPS Server), a source of high accuracy orbit predictions (Orbit Server), a global reference network (GRN Server) providing real-time GPS or GNSS assistance data to the PGPS Server, a predicted GPS client (PGPS Client) running on a device equipped with a GPS or AGPS chipset. In response to a request from the PGPS Client, the PGPS Server produces and disseminates to the PGPS Client PGPS Seed Data. The PGPS Client uses the PGPS Seed Data to propagate satellite orbits and calculate associated synthetic ephemeredes if required.

The propagated satellite orbits, or their related synthetic ephemeredes, can then be supplied to the mobile device GPS/AGPS chipset, irrespective of the GPS/AGPS chipset vendor and over a variety of data format and protocol options. The PGPS Client optionally includes a micro Secure User Plane (micro-SUPL) server SUPL is an industry standard for delivering real-time Assisted-GPS from servers located in a mobile operator network to mobile devices equipped with the necessary SUPL firmware and AGPS chipset. The PGPS Client micro-SUPL server thereby simplifies integration of the PGPS Client with the AGPS chip and SUPL firmware that may already be present on the device.

The PGPS Client Software also enables the PGPS Client Device to become a source of assistance data for other PGPS Client Devices. An example of this would be in a peer-to-peer communications context where a PGPS Client Device could relay its PGPS Seed Data or PGPS Seed Update Data to other PGPS Client Devices it is connected with. A variant of this scenario can take advantage of the presence of a local micro-SUPL server within the PGPS Client Device, whereby the PGPS Client Software can serve other PGPS Client Devices with predicted or real-time assistance data in the expected and required format.

When the GPS satellites are moved in their orbits for routine maintenance procedures, orbit predictions provided in advance to a GPS receiver are in error. Previously, all ephemeris sets beyond the time the satellite was moved would be invalid and new ephemeredes would need to be provided from to the GPS receiver over the communications network. However, it is recognized that the generalized force parameters that encompass forces such as drag, solar radiation pressure, out-gassing, etcr remain the same even though the satellite was moved and the orbit, therefore, altered. Thus, apart from occasional force parameter updates, only the position and velocity components need to be updated. Having to update only the position and velocity for the satellite results in a significant network traffic savings when satellite maintenance occurs resulting in a different trajectory. The PGPS Seed Data—a known satellite orbit vector (i.e. position and velocity at a specific time) coupled with highly optimized force model coefficients—is then used by the PGPS Client to propagate the orbits from that seed epoch for days into the future, typically with a degradation of 1-3 meters per day.

A further reduction in mobile communications network loading is achieved by providing a correction term to the last PGPS Seed Data, a so-called PGPS Seed Update Data. Advantageously, the PGPS Server also produces Seed Update Data and disseminates it to the PGPS Client. By providing PGPS Seed Update Data, the relative network loading is reduced by as much as two orders of magnitude compared to conventional predictive GPS techniques.

Preferably the PGPS Client device is a mobile network connected device Alternatively, the PGPS Client may be running on a non-mobile network connected device.

Preferably the PGPS Client device contains an onboard GPS/AGPS chipset and related firmware. The firmware may or may not provide support for Assisted-GPS industry standards such as SUPL. Alternatively, the GPS/AGPS chipset and related firmware may also reside in a peripheral device connected to the PGPS Client device.

Advantageously, the PGPS System can process blended standard real-time assistance data and predictive assistance data.

Advantageously, the PGPS System is flexibly configured to disseminate Seed Data and Seed Update Data over any wireless and wired networks, in a push, poll, automatic or combination thereof, over transport protocols including but not restricted to Internet Protocols such as Hyper Text Transfer Protocol (HTTP), Transmission Control Protocol/Internet Protocol (TCP/IP), User Datagram Protocol (UDP), Wireless Application Protocol (WAP), Short Message Service (SMS) or any appropriate custom protocol.

Advantageously, the PGPS System can automatically update Seed Data and Seed Update Data to ensure the PGPS Client operates with the latest orbit prediction model in the event a Real-Time Integrity (RTI) satellite event occurred.

BRIEF DESCRIPTION OF THE DRAWINGS

Further features and advantages will be apparent from the following detailed description, given by way of example, of a preferred embodiment taken in conjunction with the accompanying drawings, wherein:

FIG. 2 is a table of the general contents of the PGPS Seed Data set;

FIG. 3 is a table of the general contents of the PGPS Seed Update Data set;

FIGS. 4A-4C are a set of tables showing a data traffic and accuracy degradation comparison between this PGPS System and a conventional predicted GPS system over a typical 7-day period;

FIG. 5 is a table of the navigation model parameters that can be predicted by a specific orbit propagation model in the system;

FIG. 7 is a set of tables showing the PGPS Server Orbit Propagation Layer Outputs;

FIG. 9 is a tabular representation of the PGPS Client Orbit Propagation Layer Outputs.

DETAILED DESCRIPTION WITH REFERENCE TO THE DRAWINGS

Figure 1:
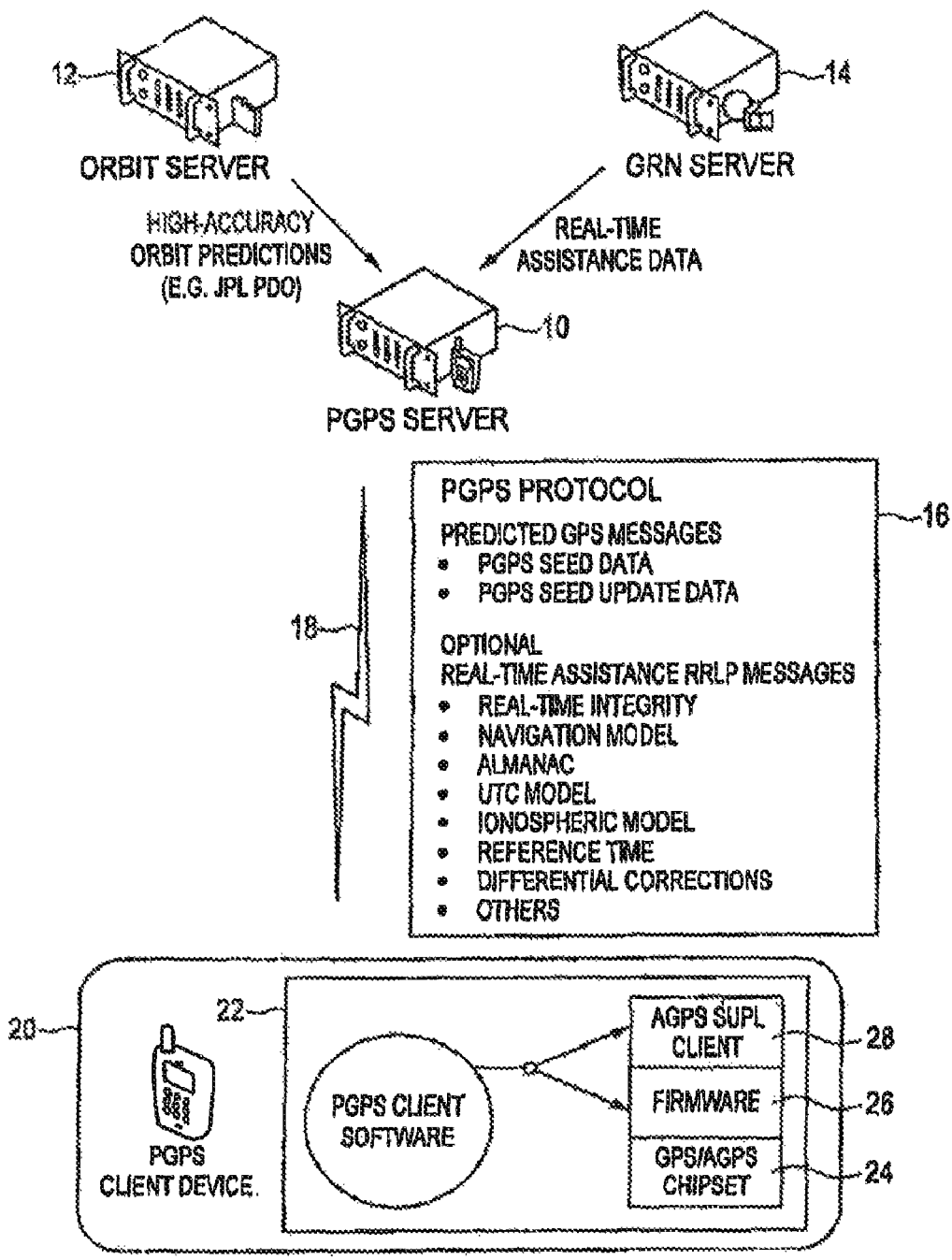
FIG. 1 is a schematic view of the Predicted GPS system.

In the following description, the acronyms used together with their meaning are set forth below:
AGPS Assisted GPS
ASN Abstract Syntax Notation One
DGPS Differential GPS
GPS Global Positioning System
GRN Global Reference Network
H-SLP Home SUPL Location Platform
HTTP Hypertext Transfer
IMSI International Mobile Subscriber Identity
IODE Issue of Data Ephemeris
IP Internet Protocol
LCS Location Services
JPL Jet Propulsion Laboratory
MIDP Mobile Information Device Profile
MS Mobile Station
OMA Open Mobile Alliance P-Code Precision Code
PER Packed Encoding Rules
PGPS Predicted GPS
PRN Pseudo Range Number
RTI Real Time Integrity
RRC Radio Resource Control
RRLP Radio Resource LCS Protocol
SET SUPL Enabled Terminal
SLP SUPL Location Platform
SMS Short Message Service
SUPL Secure User Plan Location
TCP Transmission Control Protocol
TTFF Time to First Fix
TIA Telecommunications Industry Association
LIRA User Range Accuracy
UTC Universal Coordinated Time
V-SLP Visitor SUPL Location Platform
WAP Wireless Application Protocol
XML Extensible Markup Language The preferred embodiment of the present invention, as seen in FIG. 1, consists of two main components; the PGPS Server 10 and the PGPS Client Device 20 running the PGPS Client Software 22. The PGPS Server 10 is coupled to and receives assistance data from the GRN Server 14, a Global Reference Network. The GRN Server 14 is a collection of interconnected reference stations around the world that communicate through one or more hubs. Each reference station is coupled to one or more GPS receivers and thus receives the data transmitted by each of the GPS satellites currently visible from the reference station's location Collectively, the reference stations in the GRN therefore receive the signals from all GPS satellites in the GPS constellation.

A source of high accuracy orbit prediction is required, of which several options exist. In the embodiment of the present invention, an external high accuracy orbit prediction information is obtained by the PGPS Server 10 from the Orbit Server 12, an example of which is the standard Jet Propulsion Laboratory Predictive Orbit (PDO) product. Alternatively, the PGPS Server 10 could receive high accuracy GPS orbit prediction from any other source.

The PGPS Server 10 communicates with the PGPS Client Device 20 having a PGPS Client Software 22, a GPS or an AGPS (Assisted GPS) Chipset 24, related. Firmware 26. Optionally and shown in dotted lines, the mobile device may also have an industry standard SUPL (Secure User Plane) Client 28 The GPS/AGPS Chipset 24 and related Firmware 26 could also be located on another peripheral device attached to the PGPS Client Device 20 on which the PGPS Client Software 22 is running Messages passing over a wireless or wired Communication Network 18 between the PGPS Client Device 20 and the PGPS Server 10 are set according to PGPS Protocol 16 and include PGPS Seed Data Record 30 or PGPS Seed Update Data Record 36, and optionally, standard AGPS assistance data in the form of RRLP (Radio Resource Location services Protocol) Messages, which may include Real Time Integrity (RTI), Navigation Model, Almanac, Universal Coordinated Time (UTC) Model, Ionospheric, Reference Time, Differential Correction or other assistance-related messages. The PGPS Client 20 solicits and receives Predicted GPS messages from the PGPS Server 10 over the Communications Network 18 according to the PGPS Protocol 16. Using PGPS Seed Data Record 30 and/or PGPS Seed Update Data Record 36 information, it can locally propagate satellite orbits into the future in the form of Orbit State Vectors 106. The Orbit State Vectors 106 can then be used to generate associated PGPS Navigation Model Data 42 (i.e. predicted ephemeris for each satellite). This data, along with other optional RRLP elements can then be passed on to the GPS/AGPS Chipset 24 & GPS/AGPS Firmware 26 in a couple of typical ways.

The primary and most effective method of linking the PGPS Client Software 22 with the onboard GPS/AGPS Chipset 24 & GPS/AGPS Firmware 26 is via a micro-SUPL Server 92 designed to support a subset of the SUPL protocol SUPL is a standards-based protocol 98 defined by the Open Mobile Alliance (OMA) that employs the user plane of wireless mobile networks for transferring GPS assistance data and location information. This transfer is normally done between a mobile device and a standard SUPL AGPS Server 102 in the network. Although SUPL does not explicitly support sending messages to an on-board provider of assistance data, the Predicted GPS System in the present case fits into the SUPL model by mimicking the H-SLP/V-SLP (Home SUPL Location Platform/Visitor SUPL Location Platform) in specific use cases.

Mobile integration efforts effectively amount to adapting the onboard SUPL client Firmware 26 so it becomes configurable and can be "pointed" at the onboard micro-SUPL Server 92 when operating in predictive mode. Other integration options are possible such as more directly interfacing the PGPS Client Software 22 with the GPS/AGPS Chipset 24 & GPS/AGPS Firmware 26 through their proprietary API'.s Seed Data Description The PGPS Seed Data Record 30 sets and their related PGPS Seed Update Data Record 36 sets are produced and/or updated by the PGPS Server 10 on a periodic basis. The PGPS Seed Data Record 30 is then used by a PGPS Client Software 22 to propagate satellite orbits and optionally generate PGPS Navigation Model Data 42.

The PGPS Seed Data Record 30 set, uniquely identified by its SeedID number, consists of a PGPS Seed Data Orbit State Vector 32 (velocity and X,Y,Z position) for each satellite at the current time epoch, coupled with several PGPS Seed Data Force Model Parameters 34. The PGPS Seed Data Force Model Parameters 34 include solar radiation pressure coefficient, and empirical acceleration terms at a single epoch. While computing the PGPS Seed Data Record 30 and PGPS Seed Update Data Record 36, the PGPS Server Orbit Propagation Layer 48 effectively locally runs a version of the less accurate PGPS Client Orbit Propagation Layer 86. It can then compare the expected performance of the PGPS Client Orbit Propagation Layer 86 against the high accuracy reference provided by the Orbit Server 12. The PGPS Seed Data Record 30 and PGPS Seed Update Data Record 36 parameters are thus calculated to minimize or shape the accuracy degradation over a desired time period. These parameters allow the PGPS Client Orbit Propagation Layer 86 to propagate the orbits from that epoch for days into the future with a tolerable degradation in net position accuracy of 1-3 meters per day.

The PGPS Seed Data Record 30 Structure is shown in the table of FIG. 2. The preferred embodiment of the present invention allows for the use of multiple propagation models, and thus multiple PGPS Seed Data Record 30 structures and contents, within the same PGPS System. This enables precise tailoring of the predicted GPS data performance against, for example, applications bandwidth or near versus long-term accuracy requirements. For example, the PGPS System could generate PGPS Seed Data Record 30 to yield high accuracy over the first couple of days, or to yield an even accuracy performance over a set number of days, all within a given PGPS Seed Data Record 30 size constraint. Further anticipated uses include GPS/AGPS Chipset 24 vendor-specific orbit propagation models and related PGPS Seed Data Record 30, or other high-performance third party orbit propagation models, thereby enabling third party innovation within the PGPS System framework.

Using the preferred embodiment default orbit prediction model, the PGPS Seed Data Record 30 is estimated to be 15,590 bits or 1,949 bytes to represent the entire 32 satellites constellation. This number can vary if other orbit prediction models are used, but is deemed representative of the expected data size involved. By contrast, most conventional Predicted GPS systems require 50 Kb or more for the same representation.

Seed Update Data Description

The PGPS System can work by supplying PGPS Seed Data Record 30 only. In order to maintain the highest accuracy, such data can be supplied daily, in effect, resetting the accuracy degradation back up to its best level. The PGPS System can however achieve the same effect by utilizing PGPS Seed Update Data Record 36, an optimized form of the seed that requires less bandwidth.

Each PGPS Seed Update Data Record 36 uniquely relates to a specific PGPS Seed Data Record 30. The PGPS Seed Update Data Record 36 is a smaller dataset, typically only comprised of PGPS Seed Update Data Orbit State Vectors Parameters 38 (delta factors for the related PGPS Seed Data Orbit State Vectors 32) and PGPS Seed Update Data Force Model Parameters 40 (delta factors for the related PGPS Seed Data Force Model Parameters 34) at the current epoch. The general contents of the PGPS Seed Update Data Record 36 are shown in FIG. 3.

The PGPS Client Orbit Propagation Layer 86 can use this information relative to the previously provided PGPS Seed Data Record 30 to propagate the orbits from that epoch for days with a tolerable degradation in accuracy of between 1-3 meters per day.

The PGPS Server 10 manages multiple versions of PGPS Seed Update Data Record 36, typically one for each previously generated PGPS Seed Data Record 30 over the configured PGPS Seed Data Record 30 retention window. The PGPS Server 10 can then provide the PGPS Client Software 22 with the latest PGPS Seed Update Data Record 36 related to the PGPS Seed Data Record 30 already present on the PGPS Client Software 22. The PGPS Client Orbit Propagation Layer 86 can then utilize the received PGPS Seed Update Data Record 36 to propagate the orbits to the current epoch and optionally generate matching PGPS Navigation Model Data 42. Once propagated, the PGPS Client Software 22 makes this information available to the GPS/AGPS Chipset 24 & GPS/AGPS Firmware 26 on the PGPS Client Device 20.

Using the preferred embodiment default orbit prediction model, the PGPS Seed Update Data Record 36 set is estimated to be 6,374 bits or 797 bytes to represent the entire 32 satellites constellation. This number can vary if other orbit prediction models are used, but is deemed representative of the expected data size involved. No such differential mechanism exists in conventional Predicted GPS systems.

The incorporation of the PGPS Seed Update Data Record 36 feature effectively helps maintain the highest possible accuracy (i.e. to effectively resets the degradation back to its best level) in a more data efficient manner since previously supplied Force Model Parameters 34 can easily remain valid for several days.

If a PGPS System uses multiple propagation models, PGPS Seed Update Data Record 36 can be used to update a related PGPS Seed 30 for each propagation model in the manner described above PGPS Navigation Model Data Description The PGPS Client Software 22 uses the PGPS Seed Data Record 30 and PGPS Seed Update Data Record 36 to propagate satellite orbits into the future. These Orbit State Vectors 106 can also be used to generate matching PGPS Navigation Model Data 42.

FIG. 5 shows a typical PGPS Navigation Model Data 42 record. This structure follows the standard GPS navigation model as described in mobile communications industry standards such as the 3GPP TS 44.031-Location Services (LCS); Mobile Station (MS)—Serving Mobile Location Centre (SMSC) Radio Resource LCS Protocol (RRLP) document.

Depending on the orbit propagation model in use, certain parameters in the PGPS Navigation Model Data 42 record are either predicted, zero or set to a constant value. For the default PGPS System orbit propagation model, FIG. 5 shows which parameters are predicted (PGPS Navigation Model Data Predicted Fields 45), set to zero (PGPS Navigation Model Data Zeroe'd Fields 46) or set to a suitable constant value (PGPS Navigation Model Data Constant Fields 44) provided within the PGPS Seed Data Record 30 or PGPS Seed Update Data Record 36.

The PGPS Navigation Model Data 42 record can then be delivered to the GPS/AGPS Chipset 24 & GPS/AGPS Firmware 26 either via their vendor-specific APIs or via the PGPS Client micro-SUPL Server 92.

RRLP Data Description

The PGPS Server 10 can optionally be configured to deliver a variety of real-time GPS assistance data messages in industry standard RRLP format, including;

Real-Time Integrity (RTI)
Navigation Model
Almanac
UTC model
Ionospheric Model
Reference Time
Differential Corrections
Other message types The ability to provide real-time GPS assistance data along predicted GPS capability allows for the creation of unique service combinations. For example, depending on the PGPS Service Level, the PGPS Server 10 can directly notify the PGPS Client Software 22 whenever there is a change to the RTI information. The PGPS Client Software 22 will then download the new RTI and the latest PGPS Seed Data Record 30 or PGPS Seed Update Data Record 36 message This ensures the resulting predicted information (i.e. Orbit State Vectors 106 and PGPS Navigation Model Data 42) are not subject to accuracy degradations induced by satellite orbit integrity events such as maintenance of failure. While Conventional Predicted GPS systems can also incorporate forms of realtime integrity notifications, an entire new large data file must then also be downloaded to the client to replace the existing one.

Finally, in a non-standard AGPS environment where there may not be any existing AGPS server, the PGPS Server 10 can optionally be configured to incorporate real-time GPS assistance data typically available in a basic AGPS service, namely RTI, Almanac, Ionospheric Model, UTC Model and Reference Time, alongside the PGPS Seed Data Record 30 or PGPS Seed Update Data Record 36. This assistance data is prepared in the standard RRLP format and delivered as a set of messages that can implement most of the assistance data elements typically found in a standard AGPS server. The AGPS Interface Layer 90 can therefore supply the onboard GPS/AGPS Chipset 24 & GPS/AGPS Firmware 26 with this information, if required, via its micro-SUPL Server 92 or through the GPS/AGPS Chipset 24 proprietary API.

PGPS Service Levels

The present Predicted GPS System is designed for flexibility and allows for tailored service deployments and value-added service options. There are currently four service levels:

Basic—The Basic PGPS Service Level operates on a simple client-poll basis. The PGPS Client Software 22 periodically polls the PGPS Server 10 for the latest PGPS Seed Data Record 30 or PGPS Seed Update Data Record 36. The PGPS Client Software 22 can then propagate the satellite orbits and generate PGPS Navigation Model Data 42 (i.e. ephemeredes) for future epochs. This PGPS Navigation Model Data 42 is then delivered to the GPS/AGPS Chipset 24, either directly through the Firmware 26 API or indirectly, via the micro-SUPL Server 92 and AGPS SUPL Client 28.

Premium—The Premium PGPS service incorporates a real-time mechanism whereby RTI notifications can be automatically sent to the PGPS Client Device 20 via WAP Push. These notifications will prompt the PGPS Client Software 22 to request the latest RTI message along with the latest applicable PGPS Seed Data Record 30 or PGPS Seed Update Data Record 36. The PGPS Client Software 22 can then make the PGPS Navigation Model Data 42 and RTI messages available to the GPS/AGPS Chipset 24, either directly through the Firmware 26 API or indirectly, via the micro-SUPL Server 92 and AGPS SUPL Client 28.

Advanced—The Advanced PGPS service incorporates a realtime mechanism whereby PGPS Seed Data Record 30, PGPS Seed Update Data Record 36 and RTI RRLP Messages notifications can be pushed directly to the PGPS Mobile Device 20 either via SMS 64 or through other bearers available within the wireless network architecture, for example, WAP PUSH 62. The PGPS Client Software 22 can then make the PGPS Navigation Model Data 42 and RTI messages available to the GPS/AGPS Chipset 24, either directly through the Firmware 26 API or indirectly, via the micro-SUPL Server 92 and AGPS SUPL Client 28. The Advanced PGPS Service requires deeper integration with network equipment vendors and mobile operators planning to support the service.

Figure 6:
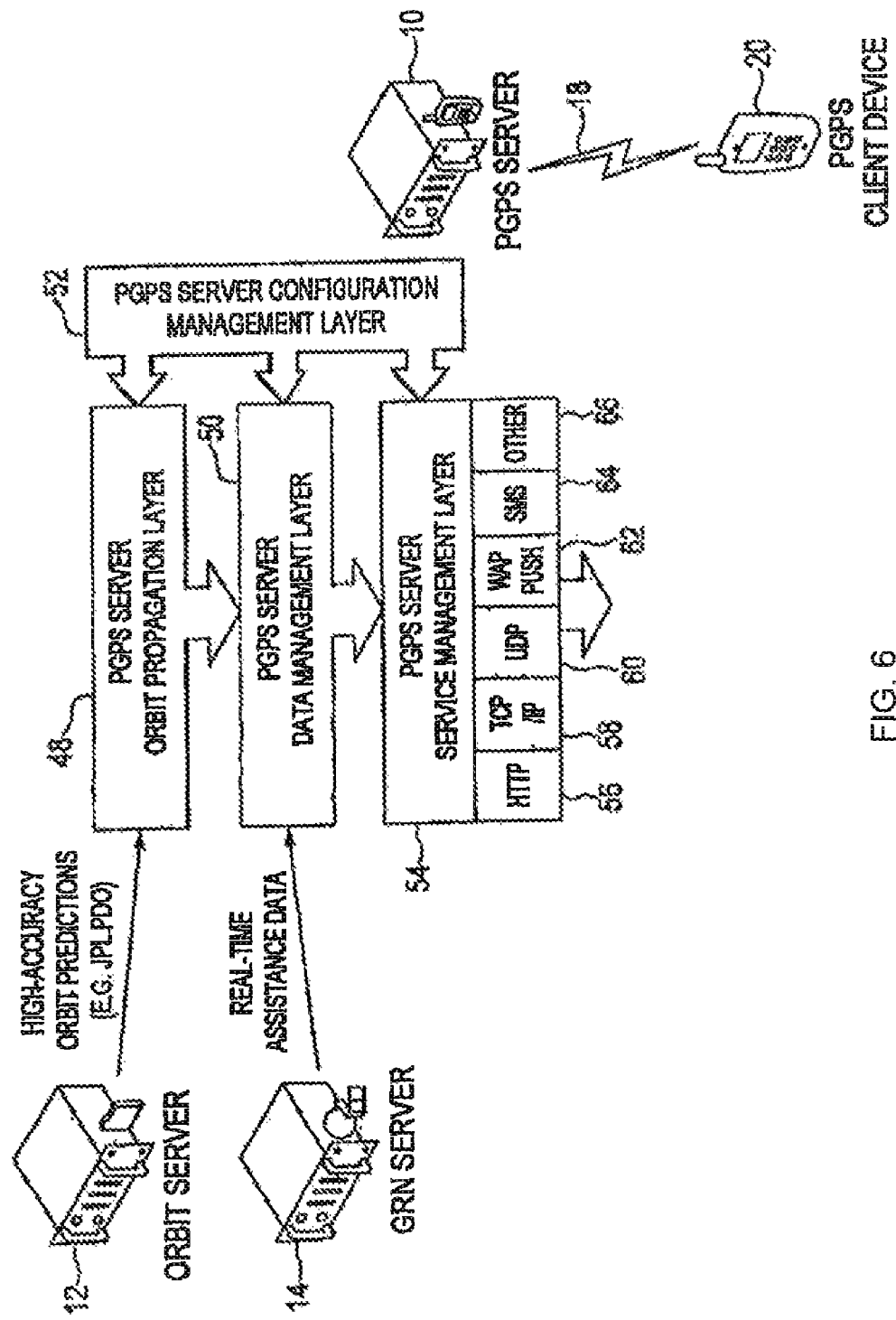
FIG. 6 is a schematic diagram showing the different functional layers of the PGPS Server.

Custom—In the case of mobile systems where there is no standard AGPS environment, or in the case of special purpose mobile devices with no SUPL client Firmware 26, the PGPS System can be fully customized to integrate not only predicted PGPS messages, but also any real-time assistance RRLP messages. The PGPS Client Software 22 is notified only when new versions of these messages are available, so that the PGPS Client Software 22 does not need to poll the PGPS Server 10 for information that may not be relevant. The PGPS Client Software 22 can then make the PGPS Navigation Model Data 42 and RRLP messages available to the GPS/AGPS Chipset 24, either directly through the Firmware 26 API or indirectly, via the micro-SUPL Server 92 and AGPS SUPL Client 28. The Custom PGPS Service requires deeper integration with network equipment vendors and mobile operators planning to support the service Predicted GPS Server The PGPS GPS Server 10 produces the PGPS Seed Data Record 30 and PGPS Seed Update Data Record 36 and provides it to the PGPS Client Software 22 as well as providing RRLP messages to the PGPS Client Software 22. As seen in FIG. 6, the PGPS Server 10 consists of a PGPS Server Orbit Propagation Layer 48, a PGPS Server Data Management Layer 60, a PGPS Server Service Management Layer 54, and a PGPS Server Configuration Layer 52. FIG. 6 shows the different layers of the PGPS Server 10.

The purpose of the PGPS Server Orbit Propagation Layer 48 is to generate the PGPS Seed Data Record 30 and PGPS Seed Update Data Records 36 needed by the PGPS Client Software 22. While computing the PGPS Seed Data Record 30 and PGPS Seed Update Data Record 36, the PGPS Server Orbit Propagation Layer 48 effectively also runs a version of the lower fidelity PGPS Client Orbit Propagation Layer 86. It can then compare the expected performance of the PGPS Client Software 22 against the high accuracy reference provided by the Orbit Server 12. The PGPS Seed Data Record 30 and PGPS Seed Update Data Record 36 parameters are thus calculated to minimize or shape the accuracy degradation over a desired time period. These parameters allow the PGPS Client Software 22 to propagate the orbits from that epoch for days into the future with a graceful degradation in accuracy, for example, 1-3 meters per day.

The preferred embodiment of the present invention allows for the use of multiple propagation models, each with its own PGPS Seed Data Record 30 and PGPS Seed Update Data Record 36 messages, within the same PGPS System. This enables precise tailoring of the PGPS System performance with respect to, for example, applications bandwidth, client processor capability, or near versus long-term accuracy requirements. For example, the PGPS System could generate PGPS Seed Data Record 30 to emphasize high accuracy over the first couple of days, or to yield a uniform accuracy performance over a set number of days, all within a given PGPS Seed Data Record 30 size constraint. Further anticipated uses include GPS/AGPS Chipset 24 vendor-specific orbit propagation models and related PGPS Seed Data Record 30, or other high-performance third party orbit propagation models, thereby enabling third party innovation within the PGPS System framework.

As shown in FIG. 7, in the default configuration, the PGPS Server Orbit Propagation Layer 48 runs once every 4 hours epoch 72. It produces the most current PGPS Seed Data 74 and a PGPS Seed Update Data Record set for previous PGPS Seed Data sets 72 (i.e. up to n days). Each prior PGPS Seed Data 72 has one corresponding PGPS Seed Update Data Record 80 set. With each new 4 hour epoch 70 when the Orbit Propagation Layer 48 runs, the current PGPS Seed Update Data Record 78 is replaced with a new one 74. For example, if the Orbit Propagation Layer 48 was configured to generate PGPS Seed Update Data Record sets for 4 days in the past, then each time it runs it would produce one new PGPS Seed Data 74 set and twenty-four (6 epochs per day=4 days=24) Seed Update Data sets.

FIG. 7 illustrates a graphical representation of the PGPS Seed Data Record 30 and PGPS Seed Update Data Record 36 that would exist if the Current Time 70 is January 23 at 8:05. Every PGPS Seed Update Data Record ID changes for each 4 hour epoch, while the PGPS Seed Data IDs remain the same. This illustrates how each PGPS Seed Update Data Record for a given PGPS Seed Data is regenerated for every epoch 72 interval.

In summary, this functional layer is responsible for the following tasks:

(1) Accepting external highly accuracy orbit prediction data references from the Orbit Server 12;

(2) Producing the current PGPS Seed Data 74;

(3) Producing the PGPS Seed Update Data Record 80 for each active PGPS Seed Data 72 generated in the preceding N epochs, where N is the number of epochs per day times the number of days (in default configuration, N=6 epochs/day-.times.4 days=24);

The inputs to this layer are as follows:

(1) Default Orbit Server 12—Standard Predicted Orbit Data from JPL;

(2) Future Orbit Server 12—third party high accuracy prediction references;

The outputs of this layer are as follows:

(1) The PGPS Server Current PGPS Seed Data Record 74 for the PGPS Server Current Seed Epoch 70;

(2) PGPS Server Current PGPS Seed Update Data Records 80 for each active PGPS Server Previous PGPS Seed Data Records 72; Data Management Layer The purpose of the Data Management Layer 30 is to manage and store the data needed by the PGPS Client Software 22. The key functions of this layer include:

(1) Receive PGPS Server Previous PGPS Seed Data Records 72, PGPS Server Current PGPS Seed Data Record 74 and PGPS Server Current PGPS Seed Update Data Records 80 from the PGPS Server Orbit Propagation Layer 48.

(2) Store each PGPS Server Previous PGPS Seed Data Records 72, PGPS Server Current PGPS Seed Data Record 74 produced by the PGPS Server Orbit Propagation Layer 48 for up to n days (default n=4);

(3) Store the latest PGPS Server Current PGPS Seed Update Data Records 80 for each stored PGPS Server Previous PGPS Seed Data Records 72 (default 24, i.e. 4 days.times.6 epochs per day);

(4) Expire PGPS Server Previous PGPS Seed Data Records 72 older than n days;

(5) Handle requests from the PGPS Server Service Management Layer 54, providing the PGPS Server Current PGPS Seed Data Record or appropriate PGPS Server Current PGPS Seed Update Data Records 80 given the current PGPS Seed Data Record 30 SeedID supplied by the PGPS Client Software 22;

(6) Receive Real-Time Integrity updates from the GRN Server 14;

(7) Notify the PGPS Server Service Management Layer 54 of changes in the Real-Time Integrity of the satellites;

(8) Handle requests from the PGPS Server Service Management Layer 54 to provide the current RTI message.

(9) Receive Real-Time Assistance Data from the GRN Server 14;

(10) In cases of RTI:

a. Depending on Service Level, notify the PGPS Server Service Management Layer 54 of changes in the Real-Time Integrity of the satellites;

b Handle requests from the PGPS Server Service Management Layer 54 to provide the current RTI message.

(11) In cases of other Real-Time Assistance Data:

a Depending on Service Level, notify the PGPS Server Service Management Layer 54 of changes in the Real-Time Assistance Data of the satellites;

b Handle requests from the PGPS Server Service Management Layer 54 to provide the Real-Time Assistance Data RRLP messages.

The inputs to this layer are the following:

(1) PGPS Server Current PGPS Seed Update Data Records, PGPS Server Current PGPS Seed Data Record 74;

(2) PGPS Server Current PGPS Seed Update Data Records 80 for each PGPS Server Current PGPS Seed Update Data Records 72;

(3) Real-Time Assistance Data.

The outputs to this layer are the following:

(1) PGPS Server Current PGPS Seed Data Record 74 (if the PGPS Client Software 22 has provided an expired Seed ID or no prior seed);

(2) PGPS Server Current PGPS Seed Update Data Record 80 matched to the client's existing valid PGPS Seed Data Record 30;

(3) The current Real-Time Assistance Data message in RRLP format.

The Service Management Layer

The purpose of the PGPS Server Service Management Layer 54 is to deliver the PGPS messages to the PGPS Client Software 22. Depending on the Service Level being implemented, this delivery can employ both push and pull technologies as well any transport protocol. The key functions of the PGPS Server Service Management Layer 54 include:

(1) Receiving and processing requests from the PGPS Client Software 22. These requests are for PGPS Seed Data Record 30, PGPS Seed Update Data Record 36 or RRLP Data messages A number of transport protocols options are available, including:

PGPS Service Management Layer HTTP Interface 56
PGPS Service Management Layer TCP/IP Interface 58
PGPS Service Management Layer UDP Interface 60
PGPS Service Management Layer WAP PUSH Interface 62
PGPS Service Management Layer SMS Interface 64
PGPS Service Management Layer Others Interface 66

(2) Packaging the PGPS message data according to ASN 1 PER convention;

(3) Sending RTI notifications to PGPS Client Devices 20 subscribing to the Premium, Advanced or Custom PGPS Service Level (4) Authenticating subscriber requests for Premium, Advanced or Custom PGPS Service Levels;

(5) Sending the PGPS message to the PGPS Client Software 22 via the requested protocol.

The inputs to this layer are the following:

(1) Requests from the PGPS Client Software 22;

(2) Current PGPS Seed Data 74 from the PGPS Server Data Management Layer 50;

(3) Applicable PGPS Seed Update Data Record 80 from the PGPS Server Data Management Layer 50;

(4) GRN RRLP Data messages from the PGPS Server Data Management Layer 50.

The outputs of this layer are the following.

(1) PGPS Server Current PGPS Seed Data Record 74;

(2) Applicable PGPS Server Current PGPS Seed Update Data Record 80;

(3) PGPS notifications for the Premium, Advanced and Custom PGPS Service Level;

(4) RTI RRLP Data messages for the Premium, and Advanced PGPS Service Level;

(5) GRN RRLP Data messages for the Custom PGPS Service Level Configuration Layer.

Each layer in the PGPS Server 10 contains specific configuration parameters that govern the operation of the system. The PGPS Server Configuration Management Layer 52 key function is to record and apply these parameters to each of the PGPS Server Layers.

Orbit Propagation Layer Configuration

The PGPS Server Orbit Propagation Layer 48 has configurable parameters that determine how frequently new PGPS Server Current PGPS Seed Data Record 74 and PGPS Server Current PGPS Seed Update Data Records 80 are produced and how far into the past PGPS Server Current PGPS Seed Update Data Records 80 will be produced.

Data Management Layer Configuration

The PGPS Server Data Management Layer 50 determines how far in the past PGPS Server Previous PGPS Seed Data Records 72 and PGPS Server Current PGPS Seed Update Data Records 80 will be managed. Any seeds older than this setting will be expired. This parameter is shared with the PGPS Server Orbit Propagation Layer 48.

Service Management Layer Configuration

The PGPS Server Service Management Layer 54 has configurable parameters that include service level option definitions and the type and location of the subscriber registration database.

The subscriber registration database is used to authenticate the subscribers against their respective PGPS Service Level This database may be internal to an operator, or from an external tool that allows registration of individual clients or group of clients. The database maintains basic PGPS subscriber information, as follows:

(1) Client ID: A unique identifier for the client such as IMSI;
(2) Service Level: The service level the client subscribes to;
(3) Service Status: e.g. Active, Inactive, Suspended;
(4) Service Start Date;
(5) Service End Date;
(6) Customer Info;
(7) Network Info (if applicable);
(8) Others; TBD. Predicted GPS Client The PGPS Client Software 22 runs and resides inside a GPS/AGPS enabled device, whether the GPS/AGPS Chipset 24 and related GPS/AGPS Firmware 26 resides on the same device or on an attached peripheral device. It receives data from the PGPS Server 10, propagates satellite orbits and generates PGPS Client Pre-Generated Predicted Orbit State Vectors 106 and associated PGPS Client Pre-Generated Predicted Navigation Model 108 for each PGPS Client Pre-Generated Predicted Data Epochs 104, and delivers assistance data to the GPS/AGPS Chipset 24 via the GPS/AGPS Firmware 26 API or via the SUPL Client 28 and micro-SUPL Server 92. As seen FIG. 8 the PGPS Client Software 22 consists of several internal components. It contains a PGPS Client Service Management Layer 82, a PGPS Client Orbit Propagation Layer 86, a PGPS Client Data Management Layer 84, a PGPS Client AGPS Interface Layer 90 and a PGPS Client micro-SUPL Server Layer 92.

Service Management Layer

The PGPS Client Service Management Layer 82 handles the PGPS Protocol 16 and handles data flow to/from the PGPS Client Orbit Propagation Layer 86 or PGPS Client Data Management Layer 84. The PGPS Client Service Management Layer 82 includes the following key functions;

(1) Periodically requesting PGPS Seed Data Record 30 and/or PGPS Seed Update Data Record 36 messages from the PGPS Server 10;
(2) Receiving PGPS Seed Data Record 30 and/or PGPS Seed Update Data Record 36 messages from the PGPS Server 10;
(3) Receiving Premium RTI Data messages from the PGPS Server 10;
(4) Providing the PGPS Seed Data Record 30 and/or PGPS Seed Update Data Record 36 to the PGPS Client Orbit Propagation Layer 86;
(5) Requesting RRLP Data messages from the PGPS Server 10;
(6) Receiving RRLP Data messages from the PGPS Server 10;
(7) Providing RRLP Data messages to the PGPS Client Data Management Layer 84.

The inputs to this layer are the following:
(1) PGPS Seed Data Record 30;
(2) PGPS Seed Update Data Record 36;
(3) RRLP Data.

The outputs of the layer are the following:
PGPS Seed Data Record 30 and PGPS Seed Update Data Record 36 (sent to the PGPS Client Orbit Propagation Layer 86);
(2) RRLP Data messages (sent to the PGPS Client Data Management Layer 84).

The PGPS Client Service Management Layer 82 will request the latest seed information from the PGPS Server 10, typically once every 3 days. The RTI RRLP messages of the Premium, Advanced or Custom PGPS Service Levels will only be requested if a notification is received from the PGPS Server 10.

PGPS Protocol

All messages between the PGPS Client Service Management Layers 82 of the PGPS Server and PGPS Client Device 20 are generally described as the PGPS Protocol 16. The PGPS Protocol 16 structure is designed to carry PGPS Seed Data Record 30, PGPS Seed Update Data Record 36 and PGPS RRLP Data messages over virtually any wired or wireless bearers. By default, the PGPS Basic Service Level PGPS Protocol 16 runs on a PGPS Service Management Layer HTTP Interface 56, while features of the Premium, Advanced and Custom Service Levels typically use a combination of PGPS Service Management Layer HTTP Interface HTTP 56, WAP/Push 62 or SMS 64 interfaces for message delivery. This section provides a description of the payload of each PGPS Seed Data Record 30 message when a default HTTP bearer protocol is used.

Messages from PGPS Client Software 22 consist of an HTTP GET request. Within each request is a message ID specifying which PGPS message is being requested. A request to get a PGPS message looks similar to the following:
GET/pgpsserver/
URI?cld=42&mask=1024&sld=1367&mode==1&version=1
Http/1.1 where parameters include:
cld: a unique ID for the mobile, typically, the IMSI;
(2) mask: the request mask specifying which messages are being requested. This mask can support a combination of PGPS Seed Data Record 30, PGPS Seed Update Data Record 36 and any GRN RRLP Data messages;
(3) sld: the PGPS Seed ID contains information about the current seed in the PGPS Client Software 22 (zero if none). The PGPS Server 10 can then provide the matching PGPS Server Current PGPS Seed Update Data Records 80 if still available, or the PGPS Server Current PGPS Seed Data Record 74.
(4) mode: a number representing the orbit prediction model in use (default=1). Additional models can be added later on, as described herein
(5) version: the version of the client.

The HTTP response has a binary data payload that is wrapped in one XML tag. A response will look similar to the following:
HTTP/1.1 200 OK
Content-Type: Application/Octet-Stream
Content-Length: Length of body
<RXN Mask="1024" version="1">data elements in binary</RXN>

The binary payload of this message can be PGPS Seed Data Record 30, PGPS Seed Update Data Record 36 or any PGPS GRN RRLP Data information depending on the service level Orbit Propagation Layer The PGPS Client Orbit Propagation Layer 86 is the computational engine that uses PGPS Seed Data Record 30 or PGPS Seed Update Data Record 36 to propagate the satellite orbit into the future and generates PGPS Client Pre-Generated Predicted Orbit State Vectors 106 and PGPS Client Pre- Generated Predicted Navigation Model 42 that can be supplied to the GPS/AGPS Chipset 24 & GPS/AGPS Firmware 26. The key functions of the PGPS Client Orbit Propagation Layer 86 include the following:

(1) Receiving PGPS Seed Data Record 30 and PGPS Seed Update Data Record 36 from the PGPS Client Service Management Layer 82.

(2) Propagating satellite orbits forward up to n days in x epochs per day (each PGPS Client Pre-Generated Predicted Data Epochs 104 typically being 15 minutes) and generate related PGPS Client Pre-Generated Predicted Orbit State Vectors 106;

(3) Generating PGPS Client Pre-Generated Predicted Navigation Model 108 for each propagated PGPS Client Pre-Generated Predicted Orbit State Vectors 106, either ahead of time or on request.

The inputs of this layer are the following:

(1) PGPS Seed Data Record 30 or PGPS Seed Update Data Record 36.

The outputs of this layer are the following:

(1) PGPS Client Pre-Generated Predicted Orbit State Vectors 106;

(2) PGPS Client Pre-Generated Predicted Navigation Model 108.

When the PGPS Client Orbit Propagation Layer 86 receives new PGPS Seed Data Record 30 or PGPS Seed Update from the PGPS Client Service Management Layer 82, it will discard previously stored PGPS Client Pre-Generated Predicted Orbit State Vectors 106 and PGPS Client Pre-Generated Predicted Navigation Model 108 after it has generated new data. New PGPS Client Pre-Generated Predicted Orbit State Vectors 106 and related PGPS Client Pre-Generated Predicted Navigation Model 108 can be generated for each satellite based on a propagation window of n hours (default n=72) with x PGPS Client Pre-Generated Predicted Data Epochs 104 per hour (default x=4, i.e. 15 minutes). FIG. 9 is a tabular representation of what is produced by the PGPS Client Orbit Propagation Layer 86. This pre-generation for several future PGPS Client Pre-Generated Predicted Data Epochs 104 can conveniently take place at night or when the device is on a charger and not otherwise in use. It then allows for a simple lookup of the applicable PGPS Client Pre-Generated Predicted Orbit State Vectors 106 or PGPS Client Pre-Generated Predicted Navigation Model 108 record when needed for a given epoch.

Alternatively, new PGPS Client Pre-Generated Predicted Orbit State Vectors 106 and related PGPS Client Pre-Generated Predicted Navigation Model 108 can be computed generated on request for each satellite based on a specific propagation epoch.

Data Management Layer

The PGS Client Data Management Layer 84 handles the data produced by the PGPS Client Orbit Propagation Layer 86 as well as the GRN data messages provided through the Premium, Advanced or Custom PGPS Service Levels The key functions of this layer include the following.

(1) Receiving GRN RRLP messages from the PGS Client Service Management Layer 82;

(2) Storing the GRN RRLP messages (3) Receiving PGPS Client Pre-Generated Predicted Orbit State Vectors 106 and related PGPS Client Pre-Generated Predicted Navigation Model 108 records from the PGS Client Orbit Propagation Layer 86;

(4) Storing PGPS Client Pre-Generated Predicted Orbit State Vectors 106 and related PGPS Client Pre-Generated Predicted Navigation Model 108 records that are younger than n hours;

(5) Expiring PGPS Client Pre-Generated Predicted Orbit State Vectors 106 and related PGPS Client Pre-Generated Predicted Navigation Model 108 records that are older than n hours;

(6) Providing the PGPS Client AGPS Interface Layer 90 with the requested PGPS Client Pre-Generated Predicted Navigation Model 108 records from the applicable current PGPS Client Pre-Generated Predicted Data Epoch 104;

(7) Providing the PGPS Client AGPS Interface Layer 90 with the requested GRN RRLP message.

The inputs to this layer are the following:

(1) PGPS Client Pre-Generated Predicted Orbit State Vectors 106;

(2) PGPS Client Pre-Generated Predicted Navigation Model 108, (3) GRN RRLP messages.

The outputs of this layer are the following:

(1) PGPS Client Pre-Generated Predicted Navigation Model 108 records for all satellites;

(2) GRN RRLP messages AGPS Interface Layer

This is where most of the actual PGPS Client Software 22 code integration takes place when porting the service to a new device. The PGPS Client AGPS Interface Layer 90 services requests from the onboard GPS/AGPS Chipset 24 & GPS/AGPS Firmware 26, either directly, or through the PGPS Client micro-SUPL Server 92 Layer. The key functions of this layer include:

(1) Receiving requests from the GPS/AGPS Chipset 24, either via the PGPS Client Direct API Integration Protocol 94 to the GPS/AGPS Firmware 26, or indirectly via PGPS Client Standard SUPL Messages Subset 96 between the PGPS Client Micro-SUPL Server Layer 92 and PGPS Client AGPS SUPL Client 28 if present;

(2) Retrieving requested information from the PGPS Client Data Management Layer 84;

(3) Sending the requested information to the GPS/AGPS Chipset 24, either via the PGPS Client Direct API Integration Protocol 94 to the GPS/AGPS Firmware 26, or indirectly via PGPS Client Standard SUPL Messages Subset 96 between the PGPS Client micro-SUPL Server Layer 92 and AGPS SUPL Client 28 if present;

The inputs to this layer are (1) Requests from the GPS/AGPS Firmware 26 or PGPS Client Micro-SUPL Server Layer 92;

(2) PGPS Client Pre-Generated Predicted Navigation Model 108 records;

(3) GRN RRLP messages.

The outputs of this layer are:

(1) PGPS Client Pre-Generated Predicted Navigation Model 108;

(2) GRN RRLP messages Micro-SUPL Protocol

New mobile devices equipped with positioning capabilities also incorporate support for the SUPL standard within their GPS/AGPS Firmware 26. The SUPL Standard Protocol 98 dictates how, among other things, GPS assistance data can passed from a SUPL AGPS Server 102 to an AGPS device. As such, mobile device vendors seeking to comply with the SUPL standard must implement an AGPS SUPL Client 28 within the device. This AGPS SUPL client 28 is built on top of the GPS/AGPS Firmware 26 that interfaces to the GPS/AGPS Chipset 24 itself.

The PGPS Client Software 22 includes can be efficiently integrated with existing SUPL-compliant devices by channeling PGPS Client Pre-Generated Predicted Navigation Model 108 and optional GRN RRLP Data via this standard SUPL framework rather than via the GPS/AGPS Chipset 24's GPS/AGPS Firmware 26 proprietary API.

Figure 8:
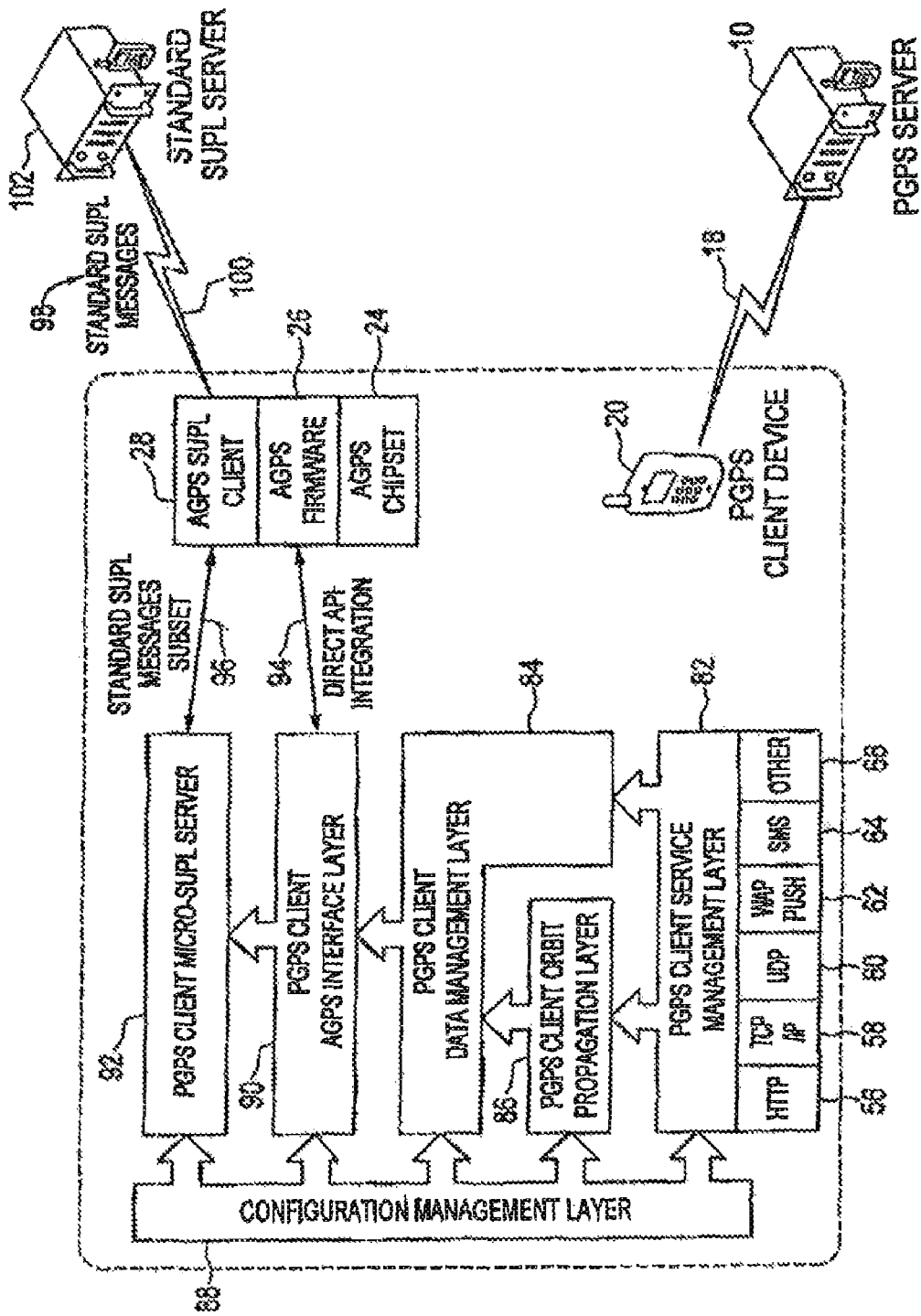
FIG. 8 is a schematic diagram showing the different functional layers of the PGPS Client.

Within the PGPS Client AGPS Interface Layer 90 discussed above, the component that services SUPL requests from the GPS/AGPS Chipset 24 & GPS/AGPS Firmware 26 is called the PGPS Client micro-SUPL Server 92 (see FIG. 8). The standard SUPL Protocol 98 does not explicitly support the notion of a device-based SUPL AGPS server of GPS assistance data. The standard SUPL Protocol 98 only contemplates a remote SUPL AGPS Server 102, whether located within the home mobile network (i.e. an H-SLP) or in the visited mobile network (i.e. a V-SLP). However, the PGPS Client micro-SUPL Server 92 in the PGPS System can appear as a SUPL AGPS Server to the PGPS Client AGPS SUPL Client 28 if the latter is configured to receive its GPS assistance data from a "local" SUPL AGPS server source. In other words, the PGPS Client micro-SUPL Server 92 can be seen as an SLP since it can mimic the core set of H-SLP/V-SLP functionality. In all SET (e.g., SUPL-enabled terminal) initiated use cases the following messages are used to communicate with the SET (SUPL enabled terminal).

(1) SUPL START
(2) SUPL RESPONSE
(3) SUPL POS INIT
(4) SUPL POS
(5) SUPL END

Therefore, the PGPS Client micro-SUPL Server Layer 92 supports a limited localized SUPL service. The PGPS Client micro-SUPL Server Layer 92 implements the following services:

(1) Receive and process SUPL START method
(2) Send the SUPL RESPONSE message;
(3) Receive and process the SUPL POS INIT message;
(4) Send the SUPL POS message;
(5) Send the SUPL END message.
(6) Receive and process the SUPL END message. Configuration Layer Each layer in the PGPS Client Software 22 contains specific configuration parameters that govern the operation of the system. The PGPS Client Configuration Layer 88 key function is to record and apply these parameters to each of the PGPS Client Software 22 layers.

(1) Service Management Layer Configuration

The PGPS Client Service Management Layer 82 has a configurable setting that determines how frequently the latest PGPS Seed Data Record 30 or PGPS Seed Data 36 is requested from the PGPS Server 10.

(2) Orbit Propagation Layer Configuration

Several parameters affect when the PGPS Client Orbit Propagation Layer 86 will run and how much propagation data is produced. The number of PGPS Client Pre-Generated Predicted Orbit State Vectors 106 and PGPS Client Pre-Generated Predicted Navigation Model 108 records is configurable. The duration of the PGPS Client Pre-Generated Predicted Data Epochs 104 is configurable Data Transfer Comparisons FIGS. 4A-4C show different data transfer requirements comparisons between this PGPS System and conventional predicted GPS systems over a typical weekly period. While the predicted orbit accuracy degradation will typically induce device position accuracy error increments of 1-3 meters per day for both system types, the present PGPS system represents data transfer savings of 73% to 96% compared with conventional predicted GPS systems over similar prediction time periods.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

The invention claimed is:

1. A mobile device, comprising:
a processor for generating a predicted orbital state vector using an initial satellite position and velocity and force model parameters received from a server, the predicted orbital state vector being used to generate satellite navigation data; and
a GNSS receiver in communication with the processor for receiving the satellite navigation data;
wherein the satellite navigation data is valid for a time period.

2. A mobile device as claimed in claim 1, wherein the GNSS receiver comprises a GPS chip.

3. A mobile device as claimed in claim 1, wherein the GNSS receiver comprises an Assisted GPS chip.

4. A mobile device as claimed in claim 1, wherein the initial satellite position and velocity and force model parameters are received from a server prior to generation of the predicted orbital state vector.

5. A mobile device as claimed in claim 1, wherein the initial satellite position and velocity and force model parameters are received following a request from the mobile device.

6. A mobile device as claimed in claim 5, wherein the initial satellite position and velocity and force model parameters are current at the time of the request.

7. A mobile device as claimed in claim 1, wherein the predicted orbital state vector is calculated using a propagation model, the propagation model being selected from multiple propagation models available based on a performance criteria.

8. A mobile device as claimed in claim 1, wherein the initial satellite position and velocity and force model parameters are received in a data record.

9. A mobile device as claimed in claim 8, wherein the data record is a change over a previously received data record.

10. A mobile device as claimed in claim 1, wherein the satellite navigation data is provided in GPS format.

11. A mobile device as claimed in claim 1, wherein the satellite navigation data is provided in GLONASS format or Galileo format.

12. A method of predicting an orbit of a satellite on a mobile device, the method comprising:
receiving, at a processor of the mobile device, an initial satellite position and velocity and force model parameters;
generating, at the processor, a predicted orbital state vector using an initial satellite position and velocity and force model parameters; and
generating, at the processor, satellite navigation data valid for a time period using the predicated orbital state vector, the processor sending the satellite navigation data to a GNSS receiver of the mobile device.

13. A method as claimed in claim 12, wherein the initial satellite position and velocity and force model parameters are received from a server prior to the predicted orbital state vector being generated.

14. A method as claimed in claim 12, wherein the initial satellite position and velocity and force model parameters are received following a request from the mobile device.

15. A method as claimed in claim 14, wherein the initial satellite position and velocity and force model parameters are current at the time of the request.

16. A method as claimed in claim 12, wherein the predicted orbital state vector is calculated using a propagation model, the propagation model being selected from multiple propagation models available based on a performance criteria.

17. A method as claimed in claim 12, wherein the initial satellite position and velocity and force model parameters are received in a data record.

18. A method as claimed in claim 17, wherein the data record is a change over a previously received data record.

19. A method as claimed in claim 12, wherein the satellite navigation data is provided in GPS format.

20. A method as claimed in claim 12, wherein the satellite navigation data is provided in GLONASS format or Galileo format.

* * * * *